July 25, 1950  A. HURST  2,516,701
DETACHABLE SWEAT BAR FOR RIMLESS SPECTACLE MOUNTINGS
Filed Dec. 10, 1947
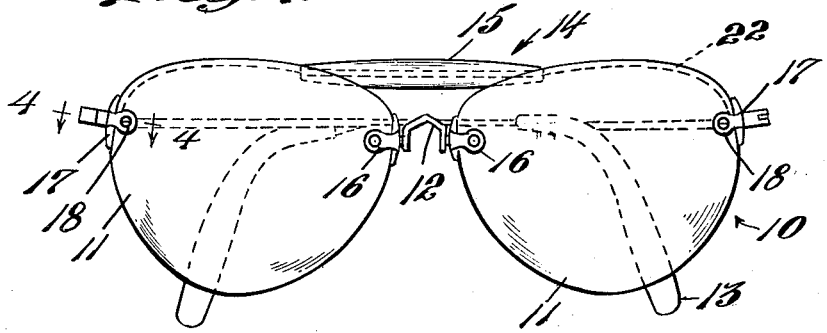
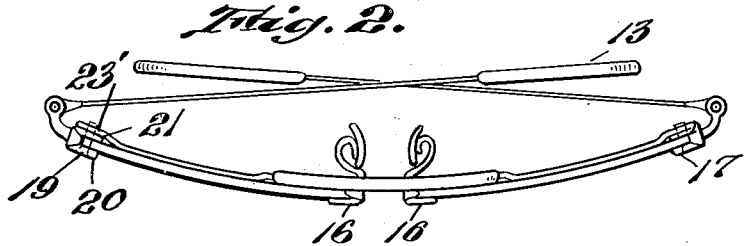
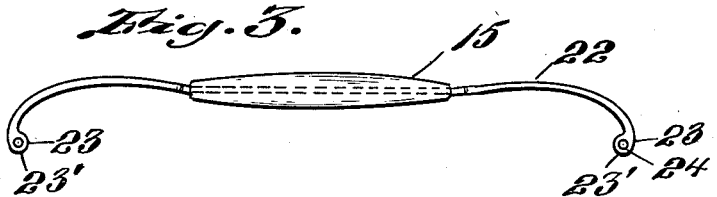
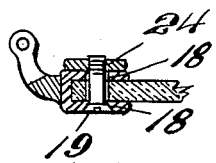
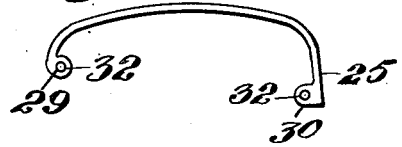
INVENTOR.
Alonzo Hurst
BY
Barlow & Barlow
ATTORNEYS.

Patented July 25, 1950

2,516,701

UNITED STATES PATENT OFFICE 2,516,701

DETACHABLE SWEAT BAR FOR RIMLESS SPECTACLE MOUNTINGS

Alonzo Hurst, Providence, R. I., assignor to Atlantic Optical Products, Inc., a corporation of Rhode Island Application December 10, 1947, Serial No. 790,767

3 Claims. (Cl. 88—41)

This invention relates to improvements in an ophthalmic mounting, particularly for rimless spectacles, goggles, or sun glasses, and consists in an improved means for attaching a bar to the lens connecting straps for supporting a cushion or for connecting the lens straps to each other.

A usual wire support for supporting a cushion and forming a so-called sweat bar for a goggle or sun glass consists of a wire bent into a shape to conform to the upper edges of the lens. This bar supports a flattened tubular member usually made of a non-metallic material providing a cushion which engages the forehead of the wearer. The end of the wire is soldered to the end strap members which connect the temples to the lens.

In certain rimless spectacles a support bar is provided for connecting the lens strap members to each other. This supporting bar has the ends thereof also soldered to the lens straps. The use of solder is objectionable in either construction for various reasons of manufacture.

An object of the invention is the provision of a construction whereby a supporting bar may be easily attached to the lens straps without the use of solder, or the employment of relatively skilled labor.

A more specific object of the invention is the provision of a sweat bar construction for goggles or sun glasses which may be detachably secured to the lens straps by means of a threaded member.

With these and other objects in view, the invention consists of certain novel features of construction as will be more fully described and particularly pointed out in the appended claims.

In the accompanying drawings:

Figure 1 is a front view of a sun glass embodying my invention;

Figure 2 is a top edge view of the sun glasses shown in Figure 1;

Figure 3 is a front view of the sweat bar;

Figure 4 is a sectional view of the lens connecting strap and sweat bar attached thereto, taken substantially along line 4—4 of Figure 1;

Figure 5 is a view of a fragmental portion of a rimless spectacle showing a bar attached to the lens strap by means of a construction embodying the invention; and Figure 6 is a front view of the supporting bar shown in Figure 5.

In carrying out my invention as applied to sun glasses, I provide a wire of a length to extend between the temple connecting straps. This wire is bent to a shape to conform to the upper edge portion of the lens. The end extremities of the wire are enlarged with the enlarged portion positioned in abutting relation with the temple attaching strap member of the lens. Each enlargement is provided with a threaded opening which will align with the openings in the adjacent lens strap and threadedly receive the usual screws connecting the straps to the lens. This wire supports a flattened tubular member forming the cushion portion of a so-called sweat bar. Thus, I provide a means for attaching the sweat bar to the sun glass without the use of solder.

Referring to the drawings for a more detailed description of the invention, 10 designates generally a rimless sun glass which comprises the usual lens 11 connected by a bridge member 12, the temples 13 for supporting the mounting on the face of the wearer, and a sweat bar or cushion 14 having a central enlargement 15 for engaging the forehead of the wearer. The bridge member 13 is attached to the lens by means of lens strap members 16, and the temples 13 by means of lens strap members 17. These two strap members 16 and 17 are of a usual construction having aligned openings 18 extending therethrough for receiving a screw 19.

The sweat bar 14 comprises a length of wire 22 (see Figure 3) which is bent to a shape to conform to the upper edges of the lens 11 and supports centrally thereof the enlargement 15 which is of a non-metallic material forming a cushion for engaging the forehead of the wearer. This cushion is of a flattened tubular formation with the wire 22 extending therethrough, and is secured to the wire in any approved manner. The end extremities 23 of the wire 22 are enlarged as at 23', and each enlargement 23' is provided with a threaded opening 24. The wire 22 is positioned in close adjacency to the upper edge of the lens with the enlargement 23' in abutting relation with the lens strap 17, and the openings 24 align with the openings 18 in the lens straps. A screw 19 extends through each of the openings 18 and threadedly engages the opening 24 and secures the wires 22 in position.

In Figure 5 I have shown a similar means for attaching a lens strap support bar 25 to the strap members 26 and 27. This re-enforcing bar 25 is bent to a shape to conform to the upper edges of the lens 28. Each end extremity of the bar is also enlarged as at 29 and 30. Each enlargement is provided with threaded openings 32. The straps 26 and 27 are of a usual construction having aligned opening 33 extending through the arms thereof. The bar 25 is positioned to place the enlargements 29 and 30 in abutting relation with the strap members 26 and 27 with the openings 32 aligned with the openings in the straps 26 and 27. A screw 34 extends through the aligned openings of each strap member and threadedly engages with the openings 32 and 33 to secure the wire 25 in place.

It may now be apparent that I have in a very simple manner provided a means for attaching a supporting bar to the lens strap of rimless spectacles without the use of solder and in which the usual screw employed for securing the strap members to the lens are also utilized for attaching the support bar in place.

I claim:

1. In rimless sun glasses and the like, having strap members for attaching the temples to the lens, each of said strap members and said lens having aligned openings extending therethrough, a sweat bar for said sun glasses comprising a single length of wire extending between said strap members with a cushion thereon and with the end portions thereof abutting said strap members, each of said end portions having a threaded opening therein aligned with the openings in an adjacent strap member and lens, and a screw extending through the openings in the strap member and lens, and engaging said threaded opening for detachably securing said sweat bar to said strap members.

2. In rimless sun glasses and the like, having strap members for attaching the temples to the lens, each of said strap members and said lens having aligned openings extending therethrough, a sweat bar for said sun glasses comprising a single length of wire extending between said strap members and with the end portions thereof abutting said strap member, said wire having a non-metallic cushion member secured thereto centrally thereof, each of said end portions having a threaded opening therein aligned with the openings in an adjacent strap member and lens, and a screw extending through the openings in the strap member and the lens, and engaging said threaded opening for detachably securing said bar to said strap members.

3. In rimless sun glasses and the like, having strap members for attaching the temples to the lens, each of said strap members and said lens having aligned openings extending therethrough, a sweat bar for said sun glasses comprising a single length of wire extending between said strap members and having an enlargement at each end portion thereof abutting said strap members, said wire having a non-metallic cushion member secured thereto centrally thereof, each of said enlarged portions having a threaded opening therein aligned with the openings in an adjacent strap member and lens, and a screw extending through the openings in the strap member and the lens, and engaging said threaded opening for detachably securing said bar to said strap members.

ALONZO HURST.

REFERENCES CITED

The following references are of record in the file of this patent:

UNITED STATES PATENTS

| Number | Name | Date |
|---|---|---|
| Re. 21,909 | Brown | Sept. 30, 1941 |
| 1,210,038 | Brennecke | Dec. 26, 1916 |
| 1,744,993 | Tamplin | Jan. 28, 1930 |
| 1,910,456 | Baker | May 23, 1933 |
| 2,063,657 | Bishop | Dec. 8, 1936 |
| 2,268,908 | Shockey | Jan. 6, 1942 |
| 2,332,160 | McDonell | Oct. 19, 1943 |
| 2,393,837 | Swanson | Jan. 29, 1946 |